(12) United States Patent
Lin et al.

(10) Patent No.: US 11,604,373 B2
(45) Date of Patent: Mar. 14, 2023

(54) ELECTRICALLY CONTROLLABLE VIEWING ANGLE SWITCH DEVICE AND DISPLAY APPARATUS

(71) Applicant: Coretronic Corporation, Hsin-Chu (TW)

(72) Inventors: Yang-Ching Lin, Hsin-Chu (TW); Chung-Yang Fang, Hsin-Chu (TW); Ping-Yen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/237,028

(22) Filed: Apr. 21, 2021

(65) Prior Publication Data
US 2021/0333579 A1    Oct. 28, 2021

(30) Foreign Application Priority Data
Apr. 23, 2020 (CN) .......................... 202010325995.4

(51) Int. Cl.
*G02F 1/13* (2006.01)
*G02F 1/1335* (2006.01)
(Continued)

(52) U.S. Cl.
CPC .......... *G02F 1/1323* (2013.01); *G02F 1/1337* (2013.01); *G02F 1/13394* (2013.01); *G02F 1/13398* (2021.01); *G02F 1/133528* (2013.01)

(58) Field of Classification Search
None
See application file for complete search history.

(56) References Cited

U.S. PATENT DOCUMENTS 6,163,358 A    12/2000 Nonaka et al.
6,603,528 B1 *  8/2003 Tanaka ................ G02F 1/13394
                                                    349/155
(Continued)

FOREIGN PATENT DOCUMENTS

CN    101158769    4/2008
CN    101310215    11/2008
(Continued)

OTHER PUBLICATIONS

"Office Action of China Counterpart Application", dated Nov. 28, 2022, p. 1-p. 11.

*Primary Examiner* — Phu Vu
(74) *Attorney, Agent, or Firm* — JCIPRNET

(57) ABSTRACT

The invention relates to an electrically controllable viewing angle switch device and a display apparatus. The switch device includes a first substrate, a second substrate, a liquid crystal layer, spacers, a first alignment film, a second alignment film, a first polarizer, and a second polarizer and has a light transmission region. The second substrate is disposed opposite to the first substrate. The liquid crystal layer and the spacers are located between the first substrate and the second substrate in the light transmission region. The spacers are fixed on the first or second substrate. The first polarizer and the second polarizer are disposed on opposite sides of the liquid crystal layer. The axial directions of the transmission axis of the first polarizer and the transmission axis of the second polarizer are parallel or perpendicular to the alignment direction of the first alignment film and the second alignment film.

11 Claims, 8 Drawing Sheets

(51) Int. Cl.
    *G02F 1/1339*     (2006.01)
    *G02F 1/1337*     (2006.01)

(56) References Cited

U.S. PATENT DOCUMENTS

| | | | | |
|---|---|---|---|---|
| 2001/0005255 | A1* | 6/2001 | Niiya | G02F 1/13392 |
| | | | | 349/189 |
| 2006/0285040 | A1* | 12/2006 | Kobayashi | G02F 1/13471 |
| | | | | 349/117 |
| 2009/0033835 | A1* | 2/2009 | Fukagawa | G02B 5/3016 |
| | | | | 359/489.07 |
| 2012/0268671 | A1* | 10/2012 | Inoue | G02B 30/30 |
| | | | | 349/155 |
| 2016/0041441 | A1* | 2/2016 | Park | G02F 1/13394 |
| | | | | 438/23 |

FOREIGN PATENT DOCUMENTS

| | | |
|---|---|---|
| CN | 103091897 | 5/2013 |
| CN | 108345139 | 7/2018 |
| CN | 207650518 | 7/2018 |
| CN | 208126055 | 11/2018 |
| JP | 2002082339 | 3/2002 |
| TW | I509332 | 11/2015 |
| TW | I582496 | 5/2017 |
| TW | I612360 | 1/2018 |
| TW | I631397 | 8/2018 |
| TW | I634373 | 9/2018 |
| TW | I679472 | 12/2019 |

\* cited by examiner

ELECTRICALLY CONTROLLABLE VIEWING ANGLE SWITCH DEVICE AND DISPLAY APPARATUS

CROSS-REFERENCE TO RELATED APPLICATION

This application claims the priority benefit of China application serial no. 202010325995.4, filed on Apr. 23, 2020. The entirety of the above-mentioned patent application is hereby incorporated by reference herein and made a part of this specification.

BACKGROUND

Technical Field

The invention relates to an anti-peeping technology, and particularly to an electrically controllable viewing angle switch device and a display apparatus.

Description of Related Art

In general, to allow multiple viewers to watch together, a display apparatus is usually capable of displaying with a wide viewing angle. However, in certain situations or occasions, such as browsing private web pages, confidential information, or entering passwords in public, the screen may be peeped by others due to the wide viewing angle display effect, causing leaks of confidential information. To make anti-peeping switchable, an anti-peeping display apparatus using liquid crystal cells has been proposed. For example, a liquid crystal cell may include two electrode layers, a liquid crystal layer disposed between the two electrode layers, and an alignment film disposed between the electrode layer and the liquid crystal layer. The alignment film may serve to define the axial direction of the optical axis of the liquid crystal layer. In most of the liquid crystal cells, ball spacers are generally adopted to control the thickness of the liquid crystal layer.

To make anti-peeping display apparatus thinner and lighter, the liquid crystal cell, after being assembled, needs to be further subjected to a thinning process, such as etching and polishing. After liquid crystal cell is etched, the external surface of the substrate of the liquid crystal cell may be less flat (e.g. having scratch-like grooves or pits), so the substrate of the liquid crystal cell also needs to be polished to remove the scratches. If the polishing pressure is excessively high, the ball spacers may be displaced to scratch the alignment film. Alternatively, if the polishing pressure is too low, the polishing effect may not be favorable, and, as a result, the qualification ratio of the subsequent processes and the display quality of the whole device may be affected. For example, bubbles that cannot be removed may be generated when a polarizer is attached.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an electrically controllable viewing angle switch device having a favorable production qualification ratio and a larger process window.

The invention provides a display apparatus with favorable display quality.

In order to achieve one or some or all of the above objectives, an embodiment of the invention provides an electrically controlled viewing angel switch. The electrically controllable viewing angle switch device has a light transmission region. The electrically controllable viewing angle switch device includes a first substrate, a second substrate, a liquid crystal layer, a plurality of spacers, a first alignment film, a second alignment film, a first polarizer, and a second polarizer. The second substrate is disposed opposite to the first substrate. The liquid crystal layer and the plurality of spacers are located between the first substrate and the second substrate and are located in the light transmission region. The plurality of spacers are fixed on the first substrate or the second substrate. The first alignment film is disposed between the first substrate and the liquid crystal layer. The second alignment film is disposed between the second substrate and the liquid crystal layer. The first polarizer and the second polarizer are disposed on opposite sides of the liquid crystal layer. An axial direction of a transmission axis of the first polarizer and an axial direction of a transmission axis of the second polarizer are respectively parallel or perpendicular to an alignment direction of the first alignment film and an alignment direction of the second alignment film.

In order to achieve one or some or all of the above objectives, an embodiment of the invention provides a display apparatus. The display apparatus includes a display panel and an electrically controllable viewing angle switch device. The display panel has a display region. The electrically controllable viewing angle switch device is stacked on the display panel and includes a first substrate, a second substrate, a liquid crystal layer, a plurality of spacers, a first alignment film, a second alignment film, a first polarizer, and a second polarizer. The second substrate is disposed opposite to the first substrate. The liquid crystal layer and the plurality of spacers are located between the first substrate and the second substrate and overlap the display region of the display panel. The plurality of spacers are fixed on the first substrate or the second substrate. The first alignment film is disposed between the first substrate and the liquid crystal layer. The second alignment film is disposed between the second substrate and the liquid crystal layer. The first polarizer and the second polarizer are disposed on opposite sides of the liquid crystal layer. An axial direction of a transmission axis of the first polarizer and an axial direction of a transmission axis of the second polarizer are respectively parallel or perpendicular to an alignment direction of the first alignment film and an alignment direction of the second alignment film.

Based on the above, in the display apparatus of the embodiments of the invention, the two alignment films and the liquid crystal layer interposed between the two alignment films are disposed between the two polarizers of the electrically controllable viewing angle switch device. With the alignment directions of the two alignment films being respectively parallel or perpendicular to the axial directions of the transmission axes of the two polarizers, the electrically controllable viewing angle switch device is capable of exhibiting a switchable viewing angle range in the direction perpendicular to the alignment directions of the alignment films. Meanwhile, the fixed relationship between the plurality of spacers and the substrates can effectively reduce scratches to the alignment films caused by the spacers during the thinning process of the substrate. Accordingly, the production qualification ratio of the electrically controllable viewing angle switch device and the display quality of the display apparatus can be facilitated.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
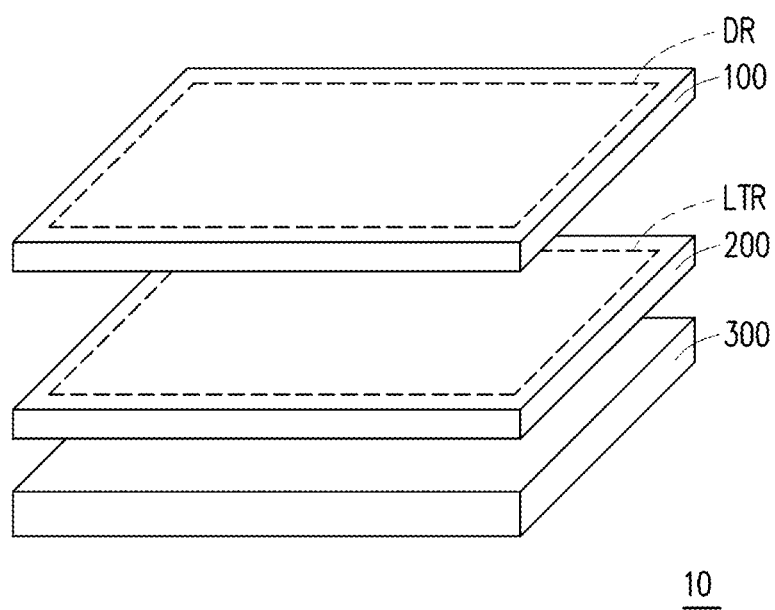
FIG. 1 is a schematic view of a display apparatus according to a first embodiment of the invention.
Figure 2A:
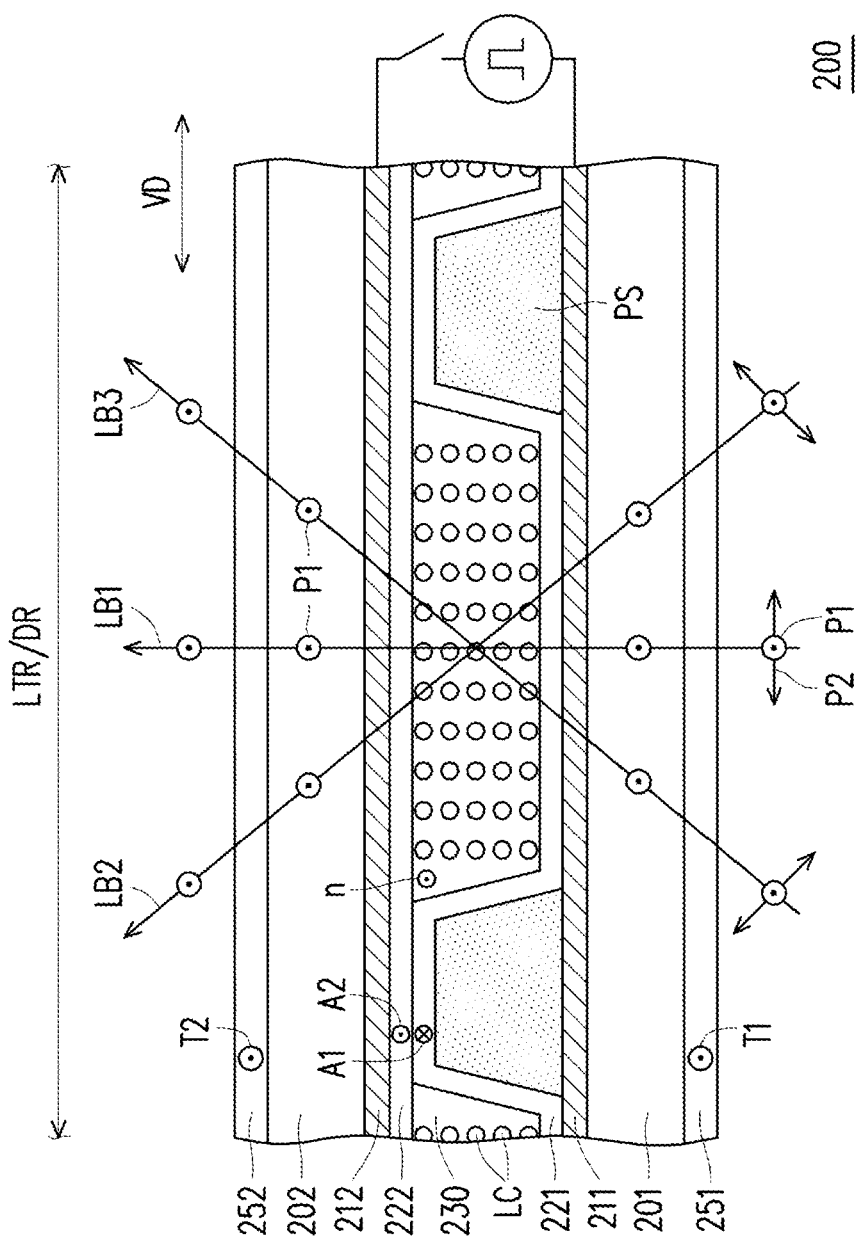
FIGS. 2A and 2B are respectively schematic cross-sectional views of an electrically controllable viewing angle switch device of FIG. 1 operating in a sharing mode and an anti-peeping mode.
Figure 2B:
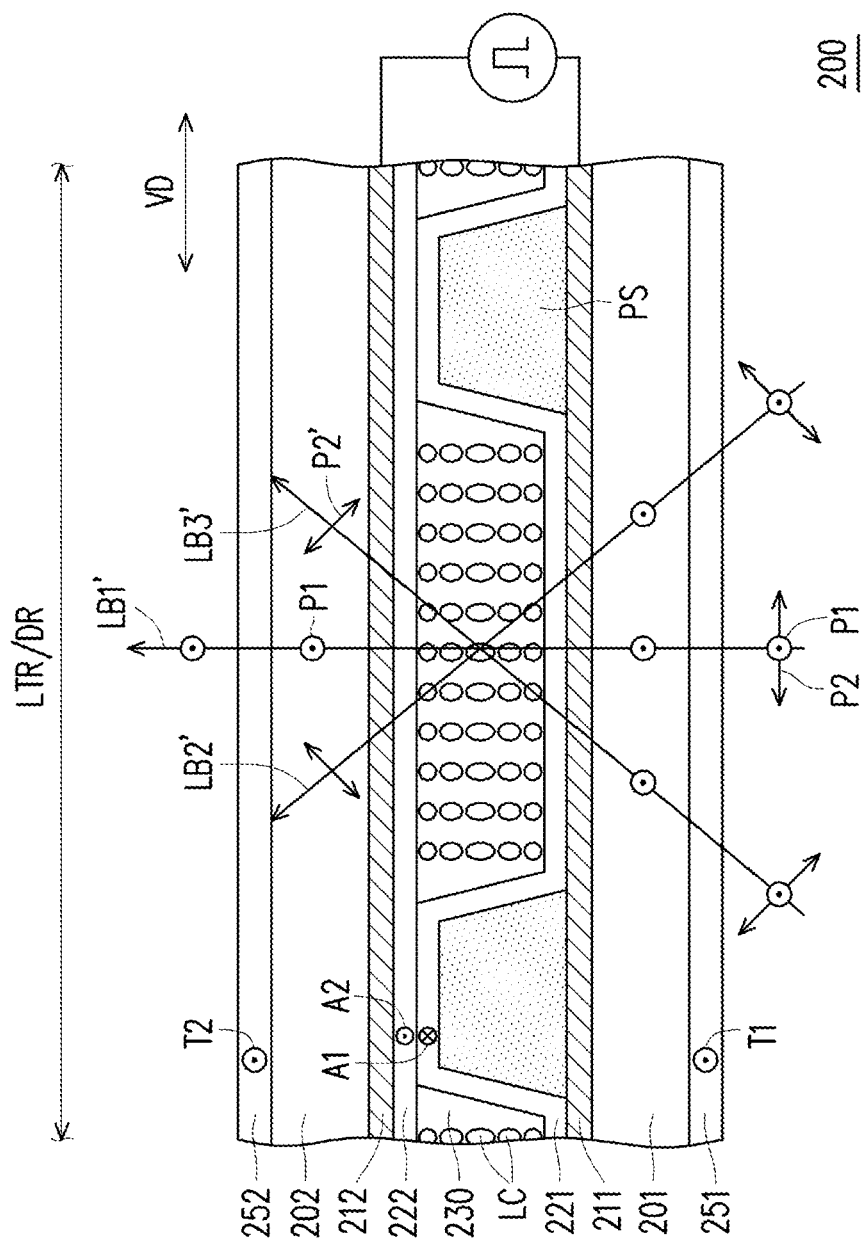
Figure 3:
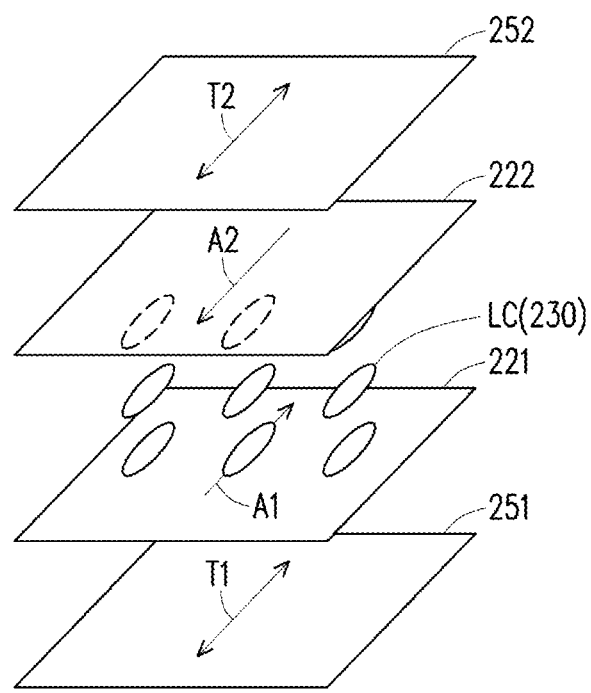
FIG. 3 is a schematic view of some layers of the electrically controllable viewing angle switch device of FIG. 1.
Figure 4:
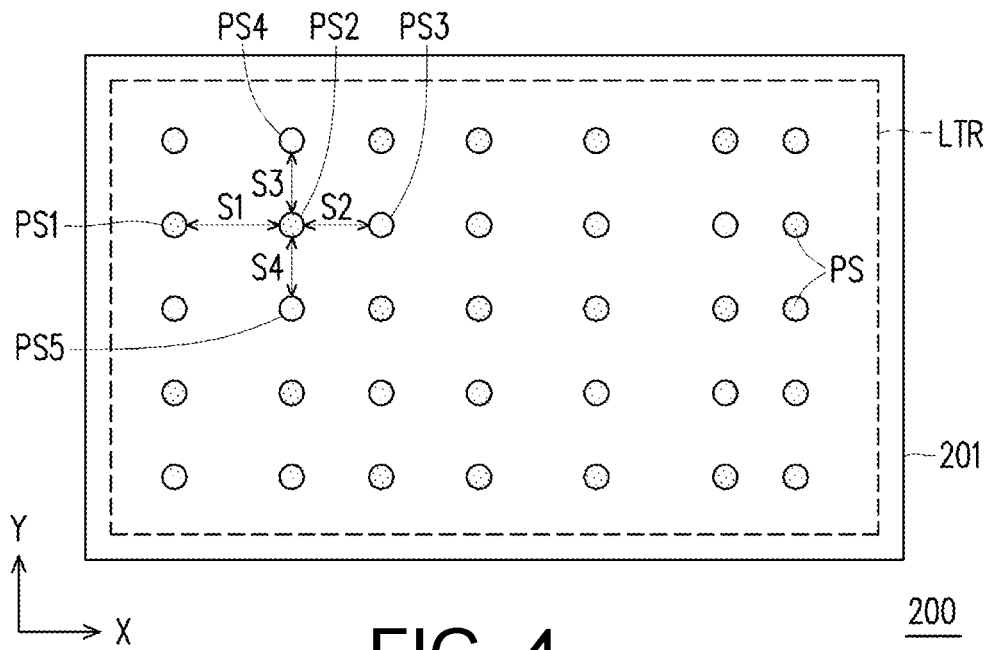
FIG. 4 is a schematic top view of the electrically controllable viewing angle switch device of FIGS. 2A and 2B.

FIG. 1 is a schematic view of a display apparatus according to a first embodiment of the invention. FIGS. 2A and 2B are respectively schematic cross-sectional views of an electrically controllable viewing angle switch device of FIG. 1 operating in a sharing mode and an anti-peeping mode. FIG. 3 is a schematic view of some layers of the electrically controllable viewing angle switch device of FIG. 1. FIG. 4 is a schematic top view of the electrically controllable viewing angle switch device of FIGS. 2A and 2B. In particular, for clarity, FIG. 4 only shows a first substrate 201 and spacer PS of FIGS. 2A and 2B.

Referring to FIG. 1, FIG. 2A, and FIG. 2B, a display apparatus 10 includes a display panel 100 and an electrically controllable viewing angle switch device 200. The display panel 100 is stacked on the electrically controllable viewing angle switch device 200. In particular, the display apparatus 10 may be operated in a sharing mode and an anti-peeping mode, and the two modes are switchable by the electrically controllable viewing angle switch device 200.

In the present embodiment, the display panel 100 is a non-emissive display panel, such as a liquid crystal display panel. Therefore, the display apparatus 10 may optionally further include a backlight module 300. The electrically controllable viewing angle switch device 200 is disposed between the display panel 100 and the backlight module 300. However, the invention is not limited thereto. In other embodiments, the display panel 100 of the display apparatus 10 may also be an organic light-emitting diode (OLED) panel, a micro light-emitting diode (Micro LED) panel, or other suitable self-emissive display panels. Moreover, the electrically controllable viewing angle switch device 200 is disposed on the light exit side of the display panel 100.

The electrically controllable viewing angle switch device 200 has a light transmission region LTR. The electrically controllable viewing angle switch device 200 includes the first substrate 201, a second substrate 202, a first electrode 211, a second electrode 212, a first alignment film 221, a second alignment film 222, and a liquid crystal layer 230. The second substrate 202 is disposed opposite to the first substrate 201. For example, in the stack direction of the display panel 100 and the electrically controllable viewing angle switch device 200, the light transmission region LTR of the electrically controllable viewing angle switch device 200 may be substantially aligned with a display region DR of the display panel 100. However, the invention is not limited thereto. According to other embodiments, the light transmission region LTR of the electrically controllable viewing angle switch device 200 may completely overlap the display region DR of the display panel 100, and the area of the light transmission region LTR is slightly greater than the area of the display region DR of the display panel 100.

The first electrode 211 and the second electrode 212 are respectively disposed on opposite side surfaces of the first substrate 201 and the second substrate 202. In the present embodiment, the first electrode 211 and the second electrode 212 may be unpatterned electrode layers. That is, the first electrode 211 and the second electrode 212 are disposed on the entire surfaces of the first substrate 201 and the second substrate 202, but the invention is not limited thereto. In other embodiments, to exert region-based control, the two electrodes may also be a plurality of conductive patterns corresponding to a plurality of control regions.

In the present embodiment, materials of the first substrate 201 and the second substrate 202 include glass, quartz, organic polymer, or other suitable materials. On the other hand, the first electrode 211 and the second electrode 212 are, for example, light-transmissive electrodes. Materials of the light-transmissive electrodes include indium tin oxide, indium zinc oxide, aluminum tin oxide, aluminum zinc oxide, or other suitable oxides, very thin metals, carbon nanotubes, graphene, or stacked layers of at least two of the above-mentioned.

The first alignment film 221 is disposed between the first substrate 201 and the liquid crystal layer 230, and the second alignment film 222 is disposed between the second substrate 202 and the liquid crystal layer 230. The liquid crystal layer 230 is disposed between the first substrate 201 and the second substrate 202. More specifically, the liquid crystal layer 230 is interposed between the first alignment film 221 and the second alignment film 222 and overlaps the light transmission region LTR. In the present embodiment, the first alignment film 221 and the second alignment film 222 respectively have an alignment direction A1 and an alignment direction A2, and the alignment direction A1 is opposite to the alignment direction A2. That is, the alignment direction A1 of the first alignment film 221 is anti-parallel to the alignment direction A2 of the second alignment film 222, but the invention is not limited thereto. In other embodiments, the alignment direction A1 of the first alignment film 221 may be substantially anti-parallel to the alignment direction A2 of the second alignment film 222. That is, the included angle between the alignment direction A1 of the first alignment film 221 and the alignment direction A2 of the second alignment film 222 is close to 180 degrees, such as between 180±20 degrees, or may be between 180±10 degrees. Therefore, when no voltage is applied between the first electrode 211 and the second electrode 212, the axial direction of an optical axis n of the liquid crystal layer 230 is substantially parallel to the alignment directions of the first alignment film 221 and the second alignment film 222. That is, the long-axis arrangement direction of a plurality of liquid crystal molecules LC of the liquid crystal layer 230 is substantially parallel to the alignment directions of the first alignment film 221 and the second alignment film 222 (as shown in FIG. 3).

Meanwhile, the electrically controllable viewing angle switch device 200 further includes a first polarizer 251 and a second polarizer 252 disposed on opposite sides of the liquid crystal layer 230. In the present embodiment, the first polarizer 251 and the second polarizer 252 may be respectively disposed on the two side surfaces of the first substrate 201 and the second substrate 202 away from the liquid crystal layer 230, but the invention is not limited thereto. Referring to FIG. 3, in the present embodiment, the axial directions of a transmission axis T1 of the first polarizer 251 and a transmission axis T2 of the second polarizer 252 are respectively parallel to the alignment direction A1 of the first alignment film 221 and the alignment direction A2 of the second alignment film 222, but the invention is not limited thereto. In other embodiments, the axial directions of the transmission axes of the two polarizers may be respectively perpendicular to the alignment directions of the two alignment films. Specifically, the axial direction of the transmission axis T1 of the first polarizer 251 may be parallel or perpendicular to the alignment direction A1 of the first alignment film 221, and the axial direction of the transmission axis T2 of the second polarizer 252 may be parallel or perpendicular to the alignment direction A2 of the second alignment film 222.

To ensure the thickness of the liquid crystal layer 230 uniform and maintained at a predetermined value, the electrically controllable viewing angle switch device 200 further includes the spacers PS. The spacers PS are disposed in the light transmission region LTR of the electrically controllable viewing angle switch device 200 and are located between the first substrate 201 and the second substrate 202. In the present embodiment, the plurality of spacers PS may be optionally fixed on the first substrate 201 and located between the first alignment film 221 and the first substrate 201. More specifically, the spacers PS may be formed on the first electrode 211 and covered by the first alignment film 221. However, the invention is not limited thereto. In another embodiment, the spacers PS may also be formed on the second substrate 202 and covered by the second alignment film 222. In yet another embodiment, the first electrode may be a plurality of structurally separated conductive patterns, and the spacers PS fixed on the first substrate 201 are respectively located between the conductive patterns.

In particular, regardless of the arrangement relationship between the spacers PS and the two electrodes, the spacers PS are disposed in the light transmission region LTR of the electrically controllable viewing angle switch device 200. Since the light transmission region LTR of the electrically controllable viewing angle switch device 200 overlaps the display region DR of the display panel 100, the spacers PS at least partially overlap pixel electrodes in the display region DR of the display panel 100. That is, the spacers PS of the electrically controllable viewing angle switch device 200 may overlap the opening area (not shown) of the pixels of the display panel 100. In the present embodiment, the material of the spacers PS may include a photoresist material, a light transmitting acrylic material, a light transmitting resin material, or other suitable light transmitting materials, but the invention is not limited thereto. Since the material of the spacers PS is a light transmitting material and the percentage of the vertical projection areas thereof is very low, the spacers PS located in the light transmission region LTR of the electrically controllable viewing angle switch device 200 do not block the display light emitted from the backlight module 300.

The fixing relationship between the spacers PS and the substrate (e.g. the first substrate 201) can effectively reduce scratches to the alignment films caused by the spacers PS during the thinning process of the first substrate 201 and/or the second substrate 202. Accordingly, the production qualification ratio of the electrically controllable viewing angle switch device 200 and the display quality of the display apparatus 10 can be facilitated. On the other hand, in order to achieve the best anti-peeping effect, the percentage of the vertical projection areas of the spacers PS on the first substrate 201 in the vertical projection area of the light transmission region LTR on the first substrate 201 is less than 5%. In an exemplary embodiment, the percentage may be less than 1%. In another exemplary embodiment, the percentage may be equal to 0.2%.

Since the spacers PS are disposed in the light transmission region LTR of the electrically controllable viewing angle switch device 200, as shown in FIG. 4, the spacers PS are arranged irregularly on the first substrate 201 to prevent interference patterns, such as moiré, generating with the spacers PS and the pixel array of the display panel 100 or the optical microstructure of the backlight module 300.

For example, the spacers PS of the electrically controllable viewing angle switch device 200 include a first spacer PS1, a second spacer PS2, and a third spacer PS3 that are sequentially arranged and adjacent to each other in the direction X. A first spacing S1 is defined between the first spacer PS1 and the second spacer PS2, a second spacing S2 is defined between the second spacer PS2 and the third spacer PS3, and the first spacing S1 is not equal to the second spacing S2. That is, the spacing between any two adjacent ones of the spacers PS arranged in the direction X may be different. Meanwhile, the spacers PS of the electrically controllable viewing angle switch device 200 further include a fourth spacer PS4 and a fifth spacer PS5 arranged adjacent to the second spacer PS2 in a direction Y, wherein the direction Y intersects the direction X. A third spacing S3 is defined between the second spacer PS2 and the fourth spacer PS4, a fourth spacing S4 is defined between the second spacer PS2 and the fifth spacer PS5, and the third spacing S3 is equal to the fourth spacing S4. That is, the spacing between any two adjacent ones of the spacers PS arranged in the direction Y may be the same.

In the present embodiment, by non-equidistantly arranging the spacers PS along the direction X on the first substrate 201, the spacers PS can be prevented from generating interference patterns in the direction X with the pixel array of the display panel 100 or the periodic structure (e.g. optical microstructure) of the backlight module 300. In the present embodiment, the contour of the vertical projection of the spacers PS on the first substrate 201 is circular, but the invention is not limited thereto.

Referring to FIG. 2A and FIG. 2B, in the present embodiment, the electrically controllable viewing angle switch device 200 may have a viewing angle control direction VD. In addition, the included angle between the viewing angle control direction VD and the alignment direction A1 of the first alignment film 221 and the included angle between the viewing angle control direction VD and the alignment direction A2 of the second alignment film 222 are respectively 90±20 degrees. For example, when the display apparatus 10 operates in the sharing mode, the electrically controllable viewing angle switch device 200 has a first viewing angle range in the viewing angle control direction VD. When the display apparatus 10 operates in the anti-peeping mode, the electrically controllable viewing angle switch device 200 has a second viewing angle range in the viewing angle control direction VD, and the second viewing angle range is more narrowed than the first viewing angle range. In other words, the electrically controllable viewing angle switch device 200 has a switchable viewing angle range perpendicular to the alignment direction of the alignment film.

The exemplary descriptions for the sharing mode and the anti-peeping mode of the display apparatus 10 will be set forth below. As shown in FIG. 2A, when no voltage is applied between the two electrodes of the electrically controllable viewing angle switch device 200 (i.e. the electrically controllable viewing angle switch device 200 is not enabled), the display apparatus 10 operates in the sharing mode. For example, when unpolarized light beams from the backlight module 300, such as a light beam LB1, a light beam LB2, and a light beam LB3, pass through the first polarizer 251, light components of second linear polarization P2 of the light beams are absorbed to form light beams having only first linear polarization P1. At this time, since the polarization directions of the first linear polarization P1 of the light beams passing through the first polarizer 251 are parallel to the axial direction of the optical axis n of the liquid crystal layer 230, the polarization state of the light beams does not change after passing through the liquid crystal layer 230. In other words, the light beams passing through the liquid crystal layer 230 still has the first linear polarization P1. Therefore, the light beam LB1, the light beam LB2, and the light beam LB3 incident to the electrically controllable angle viewing angle switch device 200 at different viewing angles may pass through the second polarizer 252 and be transmitted to the display panel 100.

As shown in FIG. 2B, when a voltage is applied between the first electrode 211 and the second electrode 212 of the electrically controllable viewing angle switch device 200 (i.e. the electrically controllable viewing angle switch device 200 is enabled), the display apparatus 10 operates in the anti-peeping mode. At this time, the electric field formed between the two electrodes may drive a plurality of liquid crystal molecules LC of the liquid crystal layer 230 to rotate to form a corresponding arrangement state. The arrangement state of the liquid crystal molecules LC (i.e. the axial distribution of the long axis) depends on the magnitude of the voltage applied between the two electrodes (or the distribution of the electric field generated between the two electrodes), and the arrangement state of the liquid crystal molecules LC may change the polarization state of the light beams.

For example, when a light beam LB1' from the first polarizer 251 is incident to the liquid crystal layer 230 from a center perspective passes through the liquid crystal molecules LC, since the polarization direction of the first linear polarization P1 is parallel to the axial direction of the long axis (or optical axis) of the liquid crystal molecules LC, the polarization state of the light beam remains unchanged. Therefore, after passing through the liquid crystal layer 230, the light beam LB1' may pass through the second polarizer 252 and be transmitted to the display panel 100. On the other hand, after light beams LB2' and LB3' from the first polarizer 251 are incident to the liquid crystal layer 230 at a predetermined viewing angle (e.g. the maximum viewable angle) pass through the liquid crystal molecules LC, the polarization state of the light beams may be converted from the first linear polarization P1 to a second linear polarization P2'. Since the polarization direction of the second linear polarization P2' is perpendicular to the axial direction of the transmission axis T2 of the second polarizer 252, the light beam LB2' and the light beam LB3' passing through the liquid crystal layer 230 may be absorbed by the second polarizer 252 and cannot be transmitted to the display panel 100. That is, the electrically controllable viewing angle switch device 200 at this time has a filter effect for light beams of the side viewing angle. Accordingly, anti-peeping display is attained.

Some other embodiments are set forth below to describe the disclosure in detail, where the same components are marked with the same reference numerals, and the description of the same technical content is omitted. The omitted content may be understood with reference to the foregoing embodiments, and will not be repeated below.

Figure 5:
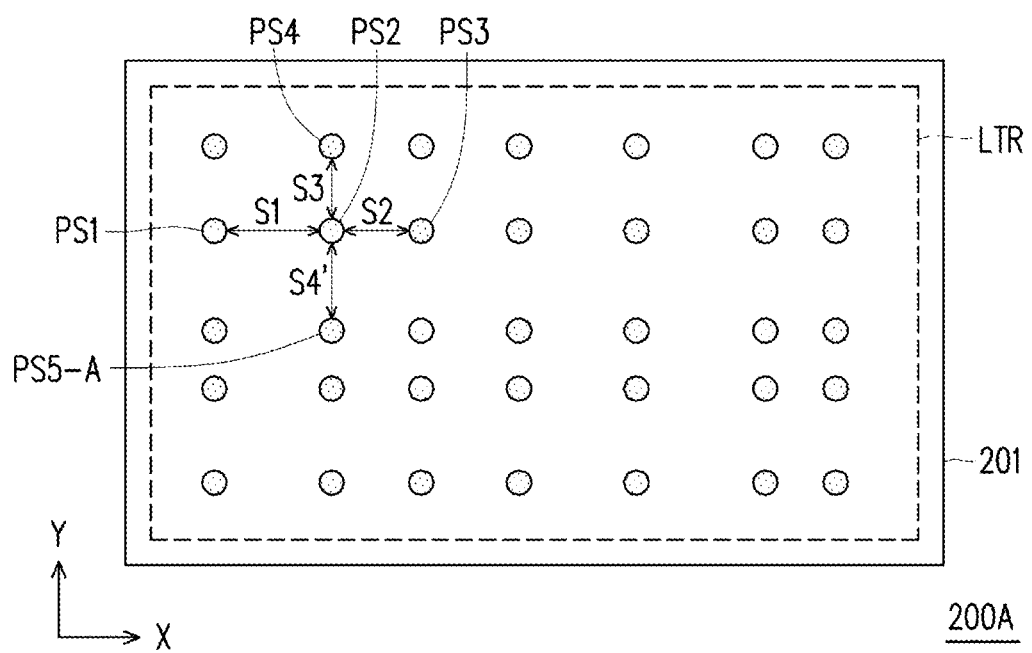
FIG. 5 is a schematic top view of an electrically controllable viewing angle switch device according to a second embodiment of the invention.
Figure 6:
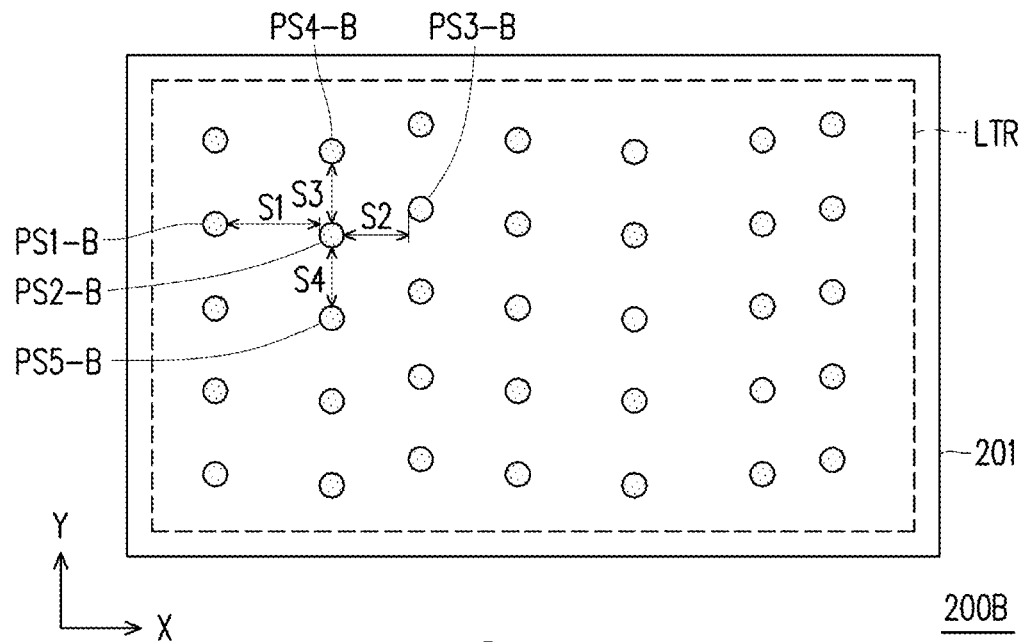
FIG. 6 is a schematic top view of an electrically controllable viewing angle switch device according to a third embodiment of the invention.
Figure 7:
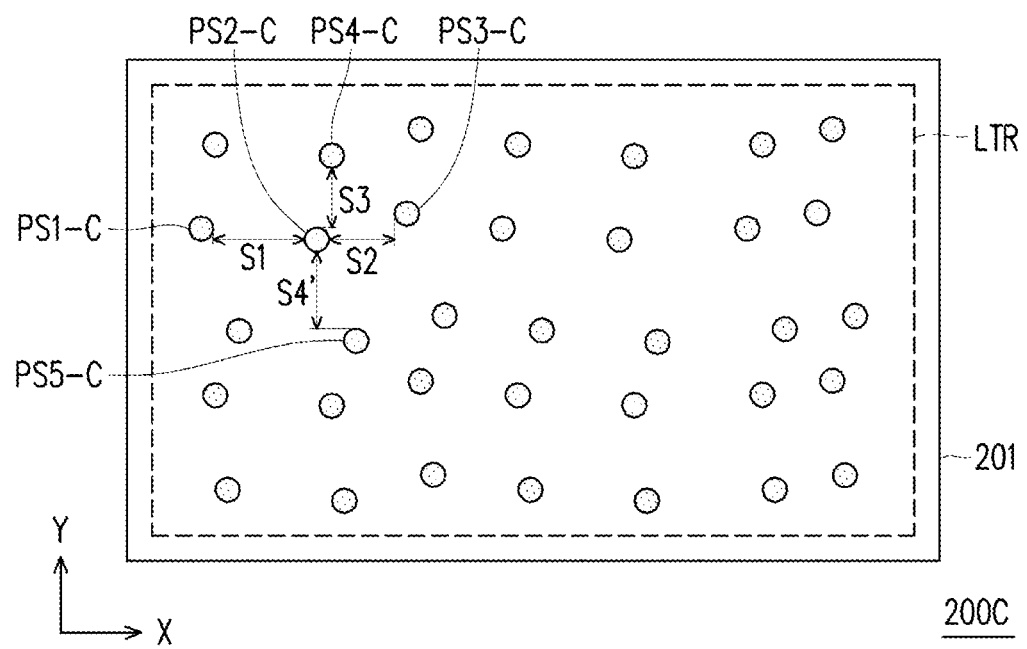
FIG. 7 is a schematic top view of an electrically controllable viewing angle switch device according to a fourth embodiment of the invention.

FIG. 5 is a schematic top view of an electrically controllable viewing angle switch device according to a second embodiment of the invention. FIG. 6 is a schematic top view of an electrically controllable viewing angle switch device according to a third embodiment of the invention. FIG. 7 is a schematic top view of an electrically controllable viewing angle switch device according to a fourth embodiment of the invention.

Referring to FIG. 5, the difference between an electrically controllable viewing angle switch device 200A of the present embodiment and the electrically controllable viewing angle switch device 200 of FIG. 4 is that the arrangement of the spacers in the direction Y is different. Specifically, the spacing S3 between the second spacer PS2 and the fourth spacer PS4 of the electrically controllable viewing angle switch device 200A is not equal to a spacing S4' between the second spacer PS2 and a fifth spacer PS5-A. That is, the spacing between any two adjacent ones of the spacers PS arranged in the direction Y may be different.

Since the spacings of the spacers arranged in the direction X and the direction Y of the present embodiment are different (or partially different), the spacers can be prevented from generating interference patterns, such as moiré, with the periodic structure (e.g. optical microstructures) of the pixel array or the backlight module of the display panel in the direction X and the direction Y.

Referring to FIG. 6, the difference between an electrically controllable viewing angle switch device 200B of the present embodiment and the electrically controllable viewing angle switch device 200 of FIG. 4 is that the arrangement of the spacers in the direction X is different. In particular, since the third spacing S3 between a fourth spacer PS4-B and a second spacer PS2-B is equal to the fourth spacing S4 between the second spacer PS2-B and a fifth spacer PS5-B in the electrically controllable viewing angle switch device 200B, and a first spacer PS1-B, the second spacer PS2-B, and a third spacer PS3-B of the electrically controllable viewing angle switch device 200B may also be misaligned with each other in the direction X. That is, the first spacer PS1-B, the second spacer PS2-B, and the third spacer PS3-B are not located on the same straight line in the direction X. That is, any two adjacent ones of the spacers arranged along the direction X are misaligned with each other in the direction X. Accordingly, the spacers can be prevented from generating interference patterns in the direction Y with the periodic structure of the pixel array or the backlight module of the display panel (e.g. optical microstructures).

Referring to FIG. 7, the difference between an electrically controllable viewing angle switch device 200C of the present embodiment and the electrically controllable viewing angle switch device 200A of FIG. 5 is that the arrangement of the spacers is different. Specifically, a first spacer PS1-C, a second spacer PS2-C, and a third spacer PS3-C of the electrically controllable viewing angle switch device 200C may be misaligned with each other in the direction X; and a fourth spacer PS4-C, the second spacer PS2-C, and a fifth spacer PS5-C may be misaligned with each other in the direction Y. That is, the first spacer PS1-C, the second spacer PS2-C, and the third spacer PS3-C are not located on the same straight line in the direction X; and the fourth spacer PS4-C, the second spacer PS2-C, and the fifth spacer PS5-C are not located on the same straight line in the direction Y. That is, any two adjacent ones of the spacers arranged along the direction X are misaligned with each other in the direction X, and any two adjacent ones of the spacers disposed along the direction Y are misaligned with each other. Accordingly, the spacers can be further prevented from generating interference patterns in the direction X and the direction Y with the pixel array of the display panel or the periodic structure (e.g. the optical microstructure) of the backlight module from.

Figure 8:
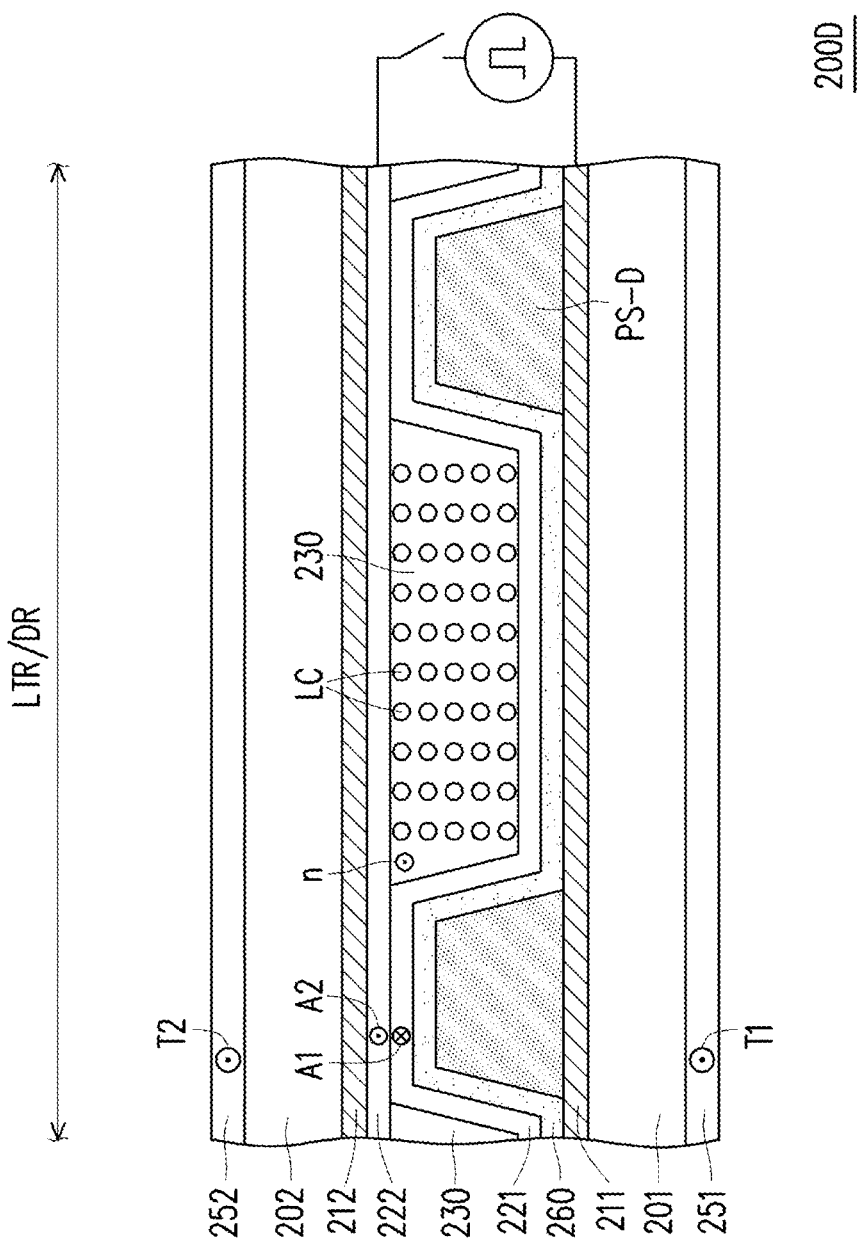
FIG. 8 is a schematic cross-sectional view of an electrically controllable viewing angle switch device according to a fifth embodiment of the invention.
Figure 9:
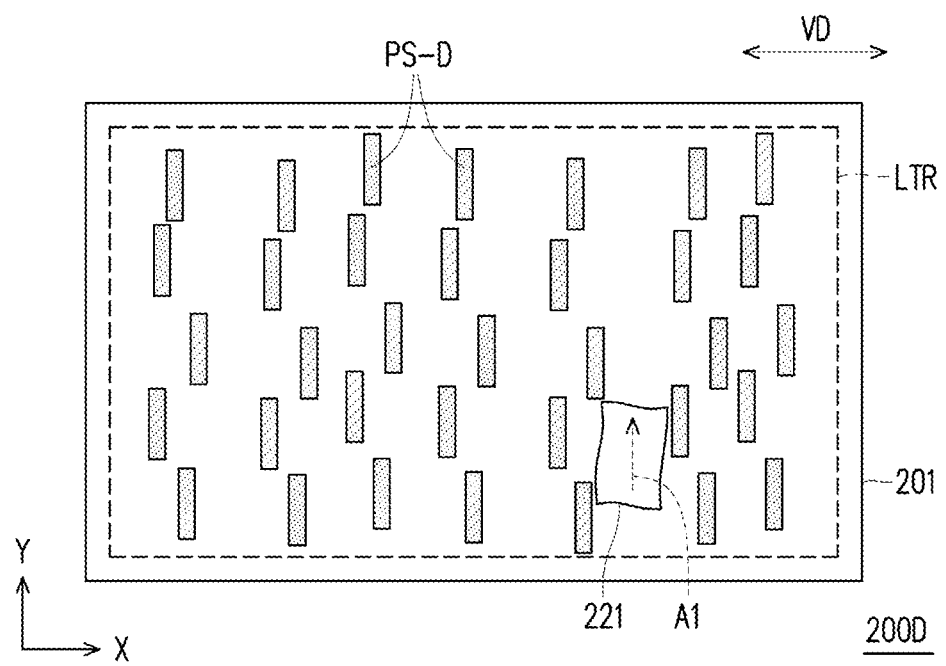
FIG. 9 is a schematic top view of the electrically controllable viewing angle switch device of FIG. 8.

FIG. 8 is a schematic cross-sectional view of an electrically controllable viewing angle switch device according to a fifth embodiment of the invention. FIG. 9 is a schematic top view of the electrically controllable viewing angle switch device of FIG. 8. In particular, for clarity, FIG. 9 only shows the first substrate 201, the first alignment film 221, and a spacer PS-D of FIG. 8.

Referring to FIG. 8 and FIG. 9, the difference between an electrically controllable viewing angle switch device 200D of the present embodiment and the electrically controllable viewing angle switch device 200 of FIG. 2A is that the configuration and the material of the spacers are different and the composition of the electrically controllable viewing angle switch device is different. In the present embodiment, the material of the spacers PS-D is a black photoresist material, and the black photoresist material includes black pigment (e.g. a conductive material such as carbon powder). In order to prevent the two electrodes on the two substrates (i.e. the first electrode 211 and the second electrode 212) from being electrically conductive to each other due to the use of a conductive photoresist material, the electrically controllable viewing angle switch device 200D may further include an insulation layer 260 disposed between the spacer PS-D and the first alignment film 221. The material of the insulation layer 260 may include silicon oxide, silicon nitride, or other suitable insulating materials.

Meanwhile, as shown in FIG. 9, the contour of the vertical projection of the spacer PS-D of the electrically controllable viewing angle switch device 200D on the first substrate 201 is strip-like. In the present embodiment, the spacers PS-D extend in the direction Y, respectively, and the extending direction of the spacers PS-D is perpendicular to the viewing angle control direction VD. In an embodiment, when the viewing angle control direction VD is substantially perpendicular to the alignment direction A1 of the first alignment film 221 and/or the alignment direction A2 of the second alignment film 222, such as when the included angle between the viewing angle control direction VD and the alignment direction A1 of the first alignment film 221 and/or the included angle between the viewing angle control direction VD and the alignment direction A2 of the second alignment film 222 are respectively 90±20 degrees, and the extending direction of the spacers PS-D may also be considered as parallel to the alignment direction A1 of the first alignment film 221 (or the alignment direction A2 of the second alignment film 222). For example, the length of the spacer PS-D in the direction Y may be between 50 μm and 100 μm. Accordingly, a greater amount of light incident at a large angle is absorbed, which facilitates the filer effect of the electrically controllable viewing angle switch device 200D at a large angle and the anti-peeping effect of the display apparatus at a large viewing angle.

In order to prevent the spacers PS-D from generating interference patterns, such as moiré, with the pixel array of the display panel or the periodic structure of the backlight module (e.g. optical microstructures) in the direction X and direction Y, the spacers PS-D of the electrically controllable viewing angle switch device 200D may also be disposed irregularly on the first substrate 201. For example, any two adjacent ones of the spacers PS-D arranged along the direction X are misaligned with each other in the direction X, and any two adjacent ones of the spacers PS-D arranged along the direction Y are misaligned with each other in the direction Y. In addition, the spacers PS-D are arranged non-equidistantly in the direction X and the direction Y. However, the invention is not limited thereto.

Based on the above, in the display apparatus of the embodiments of the invention, the two alignment films and the liquid crystal layer interposed between the two alignment films are disposed between the two polarizers of the electrically controllable viewing angle switch device. With the alignment directions of the two alignment films being respectively parallel or perpendicular to the axial directions of the transmission axes of the two polarizers, the electrically controllable viewing angle switch device is capable of exhibiting a switchable viewing angle range in the direction perpendicular to the alignment directions of the alignment films. Meanwhile, the fixed relationship between the spacers and the substrates can effectively reduce scratches to the alignment films caused by the spacers during the thinning process of the substrate. Accordingly, the production qualification ratio of the electrically controllable viewing angle switch device and the display quality of the display apparatus can be facilitated.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electrically controllable viewing angle switch device, having a light transmission region, wherein the electrically controllable viewing angle switch device comprises a first substrate, a second substrate, a liquid crystal layer, a plurality of spacers, a first alignment film, a second alignment film, a first electrode, a second electrode, a first polarizer, and a second polarizer, wherein the second substrate is disposed opposite to the first substrate, the first electrode and the second electrode are respectively disposed on opposite side surfaces of the first substrate and the second substrate, the first electrode and the second electrode are unpatterned electrode layers and are disposed on the entire surfaces of the first substrate and the second substrate, the liquid crystal layer and the plurality of spacers are located between the first substrate and the second substrate and are located in the light transmission region, the plurality of spacers are fixed on the first substrate or the second substrate, the contour of the orthogonal projection of the spacer on the first substrate is strip-like, the plurality of spacers respectively extend in a direction, the electrically controllable viewing angle switch device has a viewing angle control direction, the direction is perpendicular to the viewing angle control direction, the direction is parallel to an alignment direction of the first alignment film, and two adjacent ones of the spacers arranged along the direction are misaligned with each other in the direction, the first alignment film is disposed between the first substrate and the liquid crystal layer, the second alignment film is disposed between the second substrate and the liquid crystal layer, and the first polarizer and the second polarizer are disposed on opposite sides of the liquid crystal layer, wherein an axial direction of a transmission axis of the first polarizer and an axial direction of a transmission axis of the second polarizer are respectively parallel or perpendicular to the alignment direction of the first alignment film and an alignment direction of the second alignment film.

2. The electrically controllable viewing angle switch device according to claim 1, wherein the plurality of spacers are located between the first alignment film and the first substrate.

3. The electrically controllable viewing angle switch device according to claim 1, wherein a percentage of vertical projection areas of the plurality of spacers on the first substrate in a vertical projection area of the light transmission region on the first substrate is less than 5% and greater than or equal to 0.2%.

4. The electrically controllable viewing angle switch device according to claim 1, wherein the plurality of spacers comprise a first spacer, a second spacer, and a third spacer sequentially arranged and adjacent to each other in a first direction, a first spacing is defined between the first spacer and the second spacer, a second spacing is defined between the second spacer and the third spacer, and the first spacing is not equal to the second spacing.

5. The electrically controllable viewing angle switch device according to claim 4, wherein the first spacer, the second spacer, and the third spacer are misaligned with each other in the first direction.

6. The electrically controllable viewing angle switch device according to claim 4, wherein the plurality of spacers further comprise a fourth spacer and a fifth spacer arranged with and adjacent to the second spacer in a second direction, the second direction intersects the first direction, a third spacing is defined between the second spacer and the fourth spacer, a fourth spacing is defined between the second spacer and the fifth spacer, and the third spacing is not equal to the fourth spacing.

7. The electrically controllable viewing angle switch device according to claim 6, wherein the second spacer, the fourth spacer, and the fifth spacer are misaligned with each other in the second direction.

8. The electrically controllable viewing angle switch device according to claim 1, wherein an included angle between the viewing angle control direction and the alignment direction of the first alignment film is 90±20 degrees, and an included angle between the viewing angle control direction and the alignment direction of the second alignment film is 90±20 degrees.

9. The electrically controllable viewing angle switch device according to claim 1, wherein a material of the plurality of spacers comprises a black photoresist material.

10. The electrically controllable viewing angle switch device according to claim 9, wherein the electrically controllable viewing angle switch device further comprises
an insulation layer disposed between the plurality of spacers and the first alignment film.

11. A display apparatus, comprising a display panel and an electrically controllable viewing angle switch device,
wherein the display panel comprises a display region and the electrically controllable viewing angle switch device is stacked on the display panel and comprises a first substrate, a second substrate, a liquid crystal layer, a plurality of spacers, a first alignment film, a second alignment film, a first electrode, a second electrode, a first polarizer, and a second polarizer,
wherein the second substrate is disposed opposite to the first substrate,
the first electrode and the second electrode are respectively disposed on opposite side surfaces of the first substrate and the second substrate, the first electrode and the second electrode are unpatterned electrode layers and are disposed on the entire surfaces of the first substrate and the second substrate,
the liquid crystal layer and the plurality of spacers are located between the first substrate and the second substrate and overlap the display region of the display panel, the plurality of spacers are fixed on the first substrate or the second substrate, the contour of the orthogonal projection of the spacer on the first substrate is strip-like, the plurality of spacers respectively extend in a direction, the electrically controllable viewing angle switch device has a viewing angle control direction, the direction is perpendicular to the viewing angle control direction, the direction is parallel to an alignment direction of the first alignment film, and two adjacent ones of the spacers arranged along the direction are misaligned with each other in the direction,
the first alignment film is disposed between the first substrate and the liquid crystal layer,
the second alignment film is disposed between the second substrate and the liquid crystal layer, and
the first polarizer and the second polarizer are disposed on opposite sides of the liquid crystal layer, wherein an axial direction of a transmission axis of the first polarizer and an axial direction of a transmission axis of the second polarizer are respectively parallel or perpendicular to the alignment direction of the first alignment film and an alignment direction of the second alignment film.

* * * * *